United States Patent
Meyer et al.

[15] 3,650,068

[45] Mar. 21, 1972

[54] PROCESS FOR GROWING ALGAE

[72] Inventors: Colette Meyer, Paris; Michel Rebeller, L'Etang La Ville, both of France

[73] Assignee: Institut Francais du Petrole des Carburants et Lubrifiants, Rueil Malmaison (Hauts de Seine), France

[22] Filed: June 26, 1969

[21] Appl. No.: 836,937

[30] Foreign Application Priority Data

July 5, 1968 France...................................158,222

[52] U.S. Cl..............................................47/1.4
[51] Int. Cl................................................A01g 7/00
[58] Field of Search...................................47/1.4, 1.2

[56] References Cited

UNITED STATES PATENTS 2,725,677  12/1955  Myers.........................47/1.4

3,403,471  10/1968  Clement et al...............47/1.4

FOREIGN PATENTS OR APPLICATIONS 1,458,061  10/1966  France........................47/1.4

OTHER PUBLICATIONS

The Tanks Are Coming, Spessard, Hendrix College, 1948, pp. 44–45 relied on

Primary Examiner—Robert E. Bagwill
Attorney—I. William Millen

[57] ABSTRACT

In the open air cultivation of algae, natural brackish water is employed as make-up water instead of softened water. The culture medium is discharged at a rate sufficient to maintain the saline concentration therein at a predetermined concentration compatible with the growth of the algae. The make-up water must have a saline concentration lower than that of the culture medium, preferably at least 10 percent lower.

9 Claims, No Drawings

PROCESS FOR GROWING ALGAE

The food value of algae makes their culture particularly attractive. Thus, for example, an alga of the spirulina species contains, in the dry state, about 63 percent of proteins, 17 percent of glucides and three percent of lipides. Such algae have been grown, up to now, in media containing more than three g. of mineral salts per liter of medium. The following ions are illustrative of those present in such media: sodium, potassium, iron, magnesium, calcium, carbonate, bicarbonate, sulfate, phosphate, nitrate, chloride. In addition to the carbonates and bicarbonates, carbon is usually supplied in the form of carbon dioxide, either pure or in admixture, said carbon dioxide being provided, for example, by combustion fumes.

The pH is usually chosen between 7.5 and 12 and may be controlled, for example, by the $CO_2$ supply rate.

The cost of this culture is dependent inter alia on the price of water. Water must be found in the neighborhood in a sufficient amount and in a form compatible with the culture conditions. Thus, the known continuous culture processes made use of soft water, which substantially increased the cost of the culture. Mineral salts were also to be supplied to the algae, thus to the culture medium.

The new continuous culture process of this invention has for its object to make possible the use of salted waters and to reduce the supply of nutritive salts, thus resulting in a simplified process and a low cost of the culture.

Although some known processes made use of salted waters for starting the culture, it was always necessary to provide soft water in order to compensate for the evaporation losses; the nutritive salts were also supplied in convenient amounts. It has now been discovered that it is possible to use salted waters for replacing the vaporized water according to the process of this invention.

By salted (or rather brackish) waters, there is meant natural waters containing from 0.5 to 30 grams of dissolved salts (preferably 2 to 30) per liter. The inorganic elements which are usually found in these waters are carbonates, bicarbonates, chlorides, sulfates, for anions, calcium, magnesium, sodium and potassium for cations.

This process is of outstanding advantage since the loss of water by evaporation is about 250 m.$^3$ per thousand kilograms of dry algae when the evaporation rate is three mm. water per day. Difficult problems of water purification were to be resolved, in addition to the cost thereof, when such amounts of water had to be supplied.

The invention relates to a continuous process for growing algae in an aqueous nutritive medium of basic pH in which the water of the culture medium is a salted water and in which water evaporates during the culture, said process being characterized in maintaining the volume of culture substantially constant by the addition of salted water of lower saline concentration than that of the culture medium, and withdrawing (purging) a part of the culture medium, said part being dependent on the saline concentration to be maintained in the culture medium.

Thus, according to this invention, the continuous culture process consists of adding salted water to compensate for the evaporation loss, while continuously or stepwise purging the culture medium, i.e., rejecting a given amount of the medium. Since the saline concentration tends to increase, due to the use of salted water for compensating the evaporation losses, this concentration attains a critical value and it is then necessary to purge for maintaining the concentrations at values compatible with the type of culture.

The limiting factor, in most cases, will be the saline concentration of the culture medium, which must not exceed a value of about 70 g. per liter. It will then be usually maintained between five and 70 g. per liter, preferably between 15 and 60 g. per liter.

From an economic point of view, it is preferred that the saline concentration of the added salted water be at least 10 percent (preferably at least 50 percent) lower than the saline concentration of the culture medium.

During these purges, a portion of the nutritive elements of the culture medium is lost. The most costly elements are mainly the nitrogen, phosphorus and sulfur compounds, as well as, in the case of a culture of Cyanophyceae and particularly Spirulinae, the carbonates and bicarbonates. In the latter case, the most costly element is sodium bicarbonate Na $HCO_3$ since its cost is about 80 percent of the total cost (this percentage relates to the total cost of providing to the culture medium the nutritive elements lost during the purge).

It is thus apparent that in the process of this invention, which makes possible the continuous use of salted waters available in the culture area by means of a purge, the loss due to this purge can be practically expressed as the loss of sodium bicarbonate during the purge. In fact, the price of the grown alga is not substantially modified by this loss since, in many cases it is not necessary to supply Na $HCO_3$.

In fact, many salted waters have a sufficient concentration of bicarbonate for growing algae, and further bicarbonate ions continuously form in the culture medium: one $OH^-$ ion is formed for each nitrogen atom assimilated by the algae and this ion is converted to $HCO_3$ when $CO_2$ is introduced in the culture. Since the purge is not carried out from the start but only after the time necessary for the limiting factor to attain the selected constant concentration, and formed bicarbonate accumulates at a rate proportional to the growth rate of the algae. When the purge is carried out, a balance is produced after a given time between the purged bicarbonate and the synthesized bicarbonate, so that the bicarbonate concentration remains constant.

The other nutritive elements are mainly nitrogen, phosphorus, sulfur and potassium. These are also withdrawn by the purge; it is only necessary to add them to the culture when the salted waters contain lower amounts of these than those necessary for compensating the losses by the purge.

It would be expected that the technical and financial advantage of continuously growing algae in salted waters would be affected by the loss of nutritive elements in the purge. This is generally not the case since the salted waters and the culture medium itself not only compensate for the losses but also provide some of the elements necessary to the algae.

Thus this process is economic with respect to the consumption of water and the nutritive elements.

The composition of the salted waters changes from place to place and some unfavorable cases may occur where these waters contain excessive amounts of some elements, for example calcium or magnesium. It may then be of advantage to previously treat these waters for eliminating at least a part of these detrimental elements. This may be carried out in any known manner, for example by contacting the water with ion-exchangers.

In other unfavorable cases, the salted waters contain insufficient amounts of nutritive elements for compensating the losses due to the purge and the consumption by the algae. It will then be necessary to add the necessary elements for compensating this defect.

This process may be applied to the culture of many algae, for example Cyanophyceae, particularly of the Nostocales order, Oscillatoriaceae family, such as Spirulina maxima, Spirulina maior, Spirulina subalsa, Spirulina platensis; Anabaena, for example Anabaena circularis; Aphanizomenon; Synechooystis, for example Synechocystis salina; Synechococcus; Phormidium; Oscillatoria, for example Oscillatoria agardhii.

EXAMPLE I

Spirulina algae have been grown in open air; the amounts are given for one hectaro of culture under the following conditions:

Temperature: average of minima: 23° C.; average of maxima: 32° C.

Evaporation: five mm. per day (50 m.$^3$ per day)

Volume of culture medium: 1,000 m.$^3$

Constant saline concentration: 50 kg./m.$^3$

—volume of the purge : 33 m.³/day
—volume of additional water : 83 m.³/day

The culture medium is a brine having the following composition, expressed as Kg per m.³:

| | | | | |
|---|---|---|---|---|
| CO₃ | 3.28 | corresponding to | NaHCO₃ | 9.2 |
| HCO₃ | 3.31 | | NaCl | 9 |
| Cl | 5.62 | | KCl | 0.84 |
| SO₄ | 0.117 | | Na₂SO₄ | 0.18 |
| PO₄ | 0.049 | | Salt concentration: about 20 kg./m.³ | |
| N | 0.0196 | | Hardness : 1° | |
| Na | 6.603 | | | |
| K | 0.44 | | | |
| Mg | 0.002 | (1°=4 p.p.m. of Ca or 2.4 p.p.m. of Mg) | | |
| Ca | none | | | |

Since the brine contains sodium bicarbonate as well as other nutritive elements (N, P, K, S), less salts are required for balancing the starting culture medium. Only the following additional salts are required (amounts given for 1 m.³):

| | |
|---|---|
| NaNO₃ | 0.5 kg. |
| Fe SO₄, 7 H₂O | 0.01 kg. |
| Mg | 0.01 kg. |
| Ca | 0.007 kg. |

Di-sodium salt of ethylene diamine tetracetic acid : 0.07 kg., solution of oligoelements containing BO₃, Cu, Mn, Zn, Cr, Co, Ti, Mo, VO₃, WO₄, Ni) : two liters.

The initial pH is 10 and it is maintained at this value by continuous or stepwise injection of a combustion gas containing 10 percent of carbon dioxide.

During the culture, the nutritive elements consumed by the algae are replaced by the daily addition of a volume of a concentrated solution of inorganic compounds corresponding to the daily consumption.

After one month, the salt concentration has attained 50 kg./m.³; it is maintained at this value by means of a purge of 33 m.³ per day. Although the latter is rather important, the loss of costful elements is compensated by the brine used as additional water. It is only necessary to further add 10 kg. of NaNO₃ per day.

The average yield is 120 kg. per hectare and per day expressed as dry algae.

EXAMPLE II

An open air culture has been conducted with algae of the Spirulina maxima species, under the following conditions (amounts given for one hectare of culture):

Temperature : average of minima : 19°C.; average of maxima: 29°C.
Evaporation : three mm. water per day (30 m.³/day)
Volume of culture : 1,000 m.³
Constant salt concentration : 20 Kg./m.³
Purge volume: 6.2 m.³/day
Additional water : 36.2 m.³/day The brine used for the culture has the following composition (kg./m.³):

| | | | |
|---|---|---|---|
| HCO₃ | 0.17 | | |
| Cl | 0.42 | | |
| SO₄ | 0.55 | salt concentration: about 1.6 kg./m.₃ | |
| Ca | 0.21 | hardness : 80° | |
| Mg | 0.07 | | |
| Na | 0.22 | | |

The brine was subjected to a treatment with an ion exchanger. At the beginning, sodium bicarbonate, potassium nitrate, iron sulfate and phosphoric acid were added thereto. The culture was carried out as described in example 1. When the salt concentration attained 20 kg./m.³, a purge of 6.2 m.³/day was carried out. It was also necessary to compensate for the nutritive elements lost in the purge, but this was not costful, due to the low volume of the purge.

The average yield was 100 kg. of dry algae per hectare and per day.

What is claimed is:
1. In a continuous process for cultivating algae in a growing zone provided with an aqueous culture medium having a predetermined substantially constant saline concentration of dissolved salts between five and 70 grams per liter, wherein water is lost from said growing zone by evaporation to the open air and wherein makeup water is added to said growing zone, the improvement comprising adding, as said makeup water, a natural or substantially natural saline water having a saline concentration of dissolved salts lower than that of said predetermined saline concentration of said culture medium, and purging said culture medium from said growing zone at a rate sufficient to maintain said saline concentration of dissolved salts in said aqueous culture medium at said predetermined value.

2. A process according to claim 1, wherein the concentration of dissolved salts of the makeup water is at least 10 percent lower than the predetermined concentration of dissolved salts of the culture medium.

3. A process according to claim 2, wherein the added saline makeup water has a concentration of dissolved salts between 0.5 and 30 g. per liter.

4. A process according to claim 1, wherein at least a part of the nutritive elements consumed by the algae and withdrawn with the purge are provided to the culture medium when the addition of saline makeup water does not compensate for the losses of these elements.

5. A process according to claim 1, wherein the algae are of the Spirulina genus.

6. A process as defined by claim 1, wherein said aqueous culture medium has a basic pH.

7. A process as defined by claim 6, wherein the concentration of makeup water is at least 10 percent lower than predetermined concentration of dissolved salts of the culture medium, and the said predetermined concentration is between 15 and 60 g. per liter.

8. A process as defined by claim 1, wherein the saline makeup water has a concentration of dissolved salts between two and 30 g. per liter.

9. A process as defined by claim 8, wherein the concentration of makeup water is at least 10 percent lower than predetermined concentration of dissolved salts of the culture medium, and the said predetermined concentration is between 15 and 60 g. per liter.

* * * * *